United States Patent
Fröhlich et al.

(10) Patent No.: US 11,953,876 B2
(45) Date of Patent: Apr. 9, 2024

(54) MODULAR WIRE PROCESSING CENTER

(71) Applicants: ZOLLER & FRÖHLICH GMBH, Wangen im Allgäu (DE); WEIDMÜLLER INTERFACE GMBH & CO. KG, Detmold (DE)

(72) Inventors: Christoph Fröhlich, Wangen (DE); Hans Leupolz, Argenbühl (DE); Michael Mennig, Bad Wurzach (DE); Lars Brakemeier, Dörentrup (DE); Farhad Sarrafzadegan, Stolberg (DE); Faysal Dogan, Horn-Bad Meinberg (DE); Daniel Weingart, Detmold (DE)

(73) Assignees: ZOLLER & FRÖHLICH GMBH, Wangen Im Allgäu (DE); WEIDMÜLLER INTERFACE GMBH & CO. KG, Detmold (DE)

( * ) Notice: Subject to any disclaimer, the term of this patent is extended or adjusted under 35 U.S.C. 154(b) by 702 days.

(21) Appl. No.: 17/052,402

(22) PCT Filed: May 6, 2019

(86) PCT No.: PCT/EP2019/061562
§ 371 (c)(1),
(2) Date: Nov. 12, 2020

(87) PCT Pub. No.: WO2019/211490
PCT Pub. Date: Nov. 7, 2019

(65) Prior Publication Data
US 2021/0181704 A1    Jun. 17, 2021

(30) Foreign Application Priority Data

May 4, 2018 (DE) .................. 10 2018 110 729.3
Dec. 7, 2018 (DE) .................. 10 2018 131 439.6

(51) Int. Cl.
*G05B 19/18* (2006.01)
*H01R 43/05* (2006.01)
(Continued)

(52) U.S. Cl.
CPC .......... *G05B 19/182* (2013.01); *H01R 43/05* (2013.01); *H01R 43/052* (2013.01);
(Continued)

(58) Field of Classification Search
CPC ........ G05B 19/182; G05B 2219/40055; G05B 2219/40273; H01R 43/05; H01R 43/052; H01R 43/055
(Continued)

(56) References Cited

U.S. PATENT DOCUMENTS 4,249,433 A * 2/1981 Hara .................. H01B 13/0003
81/9.51
4,377,898 A * 3/1983 Hara .................... H02G 1/1248
81/9.51
(Continued)

FOREIGN PATENT DOCUMENTS

CN   105703193 A   6/2016
CN   105720459 A   6/2016
(Continued)

OTHER PUBLICATIONS

International Search Report and Written Opinion dated May 31, 2019 for PCT/EP2019/061562.
(Continued)

*Primary Examiner* — Ronald D Hartman, Jr.
(74) *Attorney, Agent, or Firm* — Mindful IP Law PLLC; Michael J. McCandlish

(57) ABSTRACT

A modular wire processing center comprises a plurality of individual processing modules that are controlled by a central control unit. The plurality of processing modules
(Continued)

includes an automatic crimper and at least two further processing modules selected from the group of an automatic cutter, a marking system, a stripping unit, a terminal feeding device, a wire feeding unit and a wire discharging/bundling unit. The processing modules are designed as independently operable individual processing units and are positioned with the control unit on a mobile platform.

12 Claims, 7 Drawing Sheets

(51) Int. Cl.
*H01R 43/052* (2006.01)
*H01R 43/055* (2006.01)

(52) U.S. Cl.
CPC . *H01R 43/055* (2013.01); *G05B 2219/40055* (2013.01); *G05B 2219/40273* (2013.01)

(58) Field of Classification Search
USPC .......................................................... 700/122
See application file for complete search history.

(56) References Cited

U.S. PATENT DOCUMENTS

| | | | | |
|---|---|---|---|---|
| 4,638,558 | A * | 1/1987 | Eaton | H01R 43/052 |
| | | | | 242/129 |
| 4,833,778 | A * | 5/1989 | Loustau | B21F 11/00 |
| | | | | 198/457.03 |
| 5,404,634 | A * | 4/1995 | Takeshita | H01R 43/055 |
| | | | | 29/564.6 |
| 5,820,008 | A * | 10/1998 | College | H01R 43/052 |
| | | | | 226/34 |
| 5,878,469 | A | 3/1999 | Wier | |
| 5,878,489 | A | 3/1999 | Shioda et al. | |
| 6,176,155 | B1 * | 1/2001 | Palmowski | H02G 1/1248 |
| | | | | 81/9.51 |
| 6,490,498 | B1 | 12/2002 | Takagi | |
| 6,662,444 | B2 | 12/2003 | Takada | |
| 8,442,664 | B1 | 5/2013 | Guglielmo et al. | |
| 2001/0036394 | A1 | 11/2001 | Tanaka et al. | |
| 2004/0255723 | A1 * | 12/2004 | Palmowski | H02G 1/1265 |
| | | | | 81/9.51 |
| 2009/0012642 | A1 | 1/2009 | Mertens et al. | |
| 2009/0235522 | A1 | 9/2009 | Kihara | |
| 2010/0293780 | A1 | 11/2010 | Kirst | |
| 2013/0299039 | A1 | 11/2013 | Depaulis | |

FOREIGN PATENT DOCUMENTS

| | | | | |
|---|---|---|---|---|
| CN | 205335608 | U | 6/2016 | |
| CN | 105790036 | A * | 7/2016 | ............ H01R 43/00 |
| CN | 106711729 | A * | 5/2017 | |
| CN | 107834338 | A | 3/2018 | |
| DE | 9308266.5 | | 9/1993 | |
| DE | 4440835 | C1 | 8/1996 | |
| DE | 19714964 | C1 | 7/1998 | |
| DE | 19831588 | A1 | 9/1999 | |
| DE | 102004057818 | B3 | 8/2006 | |
| DE | 102015102060 | A1 | 8/2016 | |
| DE | 102015119217 | A1 | 11/2017 | |
| DE | 102017118968 | A1 | 2/2019 | |
| EP | 0132092 | A1 | 1/1985 | |
| EP | 0181780 | A2 * | 5/1986 | ............ H01R 43/28 |
| EP | 0495164 | A2 | 7/1992 | |
| JP | 2000280147 | A | 10/2000 | |
| JP | 2001219341 | A | 8/2001 | |
| JP | 2001312928 | A | 11/2001 | |
| JP | 2001359216 | A | 12/2001 | |
| JP | 2005151778 | A | 6/2005 | |
| JP | 2007530303 | A | 11/2007 | |
| JP | 2018041136 | A | 3/2018 | |
| RU | 160758 | U1 | 9/2014 | |
| WO | WO-8903601 | A1 * | 4/1989 | ............ H01R 43/28 |
| WO | 2008059845 | A1 | 5/2008 | |
| WO | WO-2018066388 | A1 * | 4/2018 | ............ H01B 13/00 |

OTHER PUBLICATIONS

Translated 2nd CN OA Issued against correlated CN Application No. 201980029951.2 dated Feb. 9, 2022.
English Translation of German Office Action for file reference 10 2018 131 439.6 dated Apr. 9, 2019.
English Translation of International Preliminary Report on Patentability and Written Opinion of PCT/EP2019/061562 dated Nov. 19, 2020.
Chinese 1st Office Action dated Sep. 14, 2021, with English translation re Chinese Application No. 201980029951.2 (15 pages).

* cited by examiner

MODULAR WIRE PROCESSING CENTER

CROSS-REFERENCE TO RELATED APPLICATIONS

This application is a national stage of, and claims priority to, Patent Cooperation Treaty Application No. PCT/EP2019/061562, filed on May 6, 2019, which application claims priority to German Application No. DE 10 2018 110 729.3, filed on May 4, 2018 and German Application No. DE 10 2018 131 439.6 filed on Dec. 7, 2018, which applications are hereby incorporated herein by reference in their entireties.

INTRODUCTION

The disclosure relates to a modular wire processing center (WPC) for assembling wires to be laid in switch cabinets, for example.

By means of a WPC of this type wires and cables can be fed, cut to length, provided with a marker and crimped with a terminal such as, e.g., a ferrule. Then the assembled wires are usually bundled and received in a storage system. Such center is disclosed, for example, in U.S. Pat. No. 8,442,664 B1. The actual wire assembly is performed by a unit in the form of a special-purpose machine which enables the afore-described working steps. Such a unit has an extremely complex structure and can be adapted to different manufacturing steps with great effort only. Moreover, such a special-purpose machine is relatively expensive and requires large installation space within the production line.

A similar solution is described in EP 0 132 092 A1. This document discloses an apparatus for manufacturing wire harnesses in which wires/cables are fed by means of a wire feeding device and terminals are fed by means of another feeding device. The wires are cut to length by means of a cutter and are crimped with terminals by an automatic crimper. For further processing, the assembled wires then are moved along via a measuring and feeding device. A crimp head and a forming tool receiving the terminal during crimping are configured as separate units, with the cutter being integrated in the unit receiving the crimp head. This apparatus shows the same drawbacks as the afore-described special-purpose machine.

In publication U.S. Pat. No. 6,662,444 B2, a method and an apparatus are disclosed, wherein either an end portion of a wire can be crimped with a terminal and/or another end portion can be press-fitted to a connector. The apparatus used to this end includes a wire feed device through which wires are cut to length and the respective terminals are stripped for contacting a crimp terminal or the connector. Cutting to length is performed by means of a cutter, the cut-to-length cables/wires then are bent to U-shape and are positioned at an intermediate storage from which the wires are fed to another press-fitting/crimping device.

This solution, too, is a special-purpose machine which is designed concretely for the predetermined purpose.

Document U.S. Pat. No. 5,878,469 A relates to a device for processing wire harnesses which comprises a cutter, a stripper, a type of crimping unit and a device for connection to a connector. This solution, too, is designed as a special-purpose machine and is not or only with considerable effort adaptable to different manufacturing jobs.

A more flexible solution consists in providing, instead of a special-purpose machine, modular units at which the individual processing steps (cutting to length, marking, stripping, crimping, bundling) are carried out by an operator. Crimping is performed by a crimping machine, as it is known, for example, from the patent specification DE 44 40 835 C1 to Applicant, and serves for press-fitting ferrules to a stripped wire terminal. Said ferrules are wound, in the known solution, as webbing onto a reel magazine and, from there, are fed to a crimp head via a transport unit. Alternatively, the ferrules or terminals can also be received loosely in a storage and then can be fed, at a defined position, to the crimp head via a suitable feeding device. Such feeding device is described, for example, in DE 198 31 588 A1.

In the known solutions, the ferrule to be crimped is attached to the stripped wire terminal by means of a retaining unit and is then press-fitted via the crimp head. Stripping of the wire terminal can be performed either externally or via a stripping head integrated in the crimping machine.

The afore-described modular units are standalone units each of which is provided, for example, with inherent drive units and thus is usually operated independently of further processing units.

The structure of a transport unit for conveying the ferrules arranged on a webbing or any other electric components is described e.g. in publication G 93 08 266.5 to Applicant. A similar transport unit is also disclosed in DE 197 14 964 C1.

US patent application US 2010/0 293 780 A1 illustrates a movable unit via which terminals to be processed can be positioned in the area of a stationary wire assembling apparatus in the form of a special-purpose machine.

In series production, various wire cross-sections and electric components/terminals are required to be press-fitted into each other and then to be built in a subsequent mounting step, for example when mounting a switch cabinet. For this purpose, basically two options are given: In one variant, the crimping machine is refitted for press-fitting different wire cross-sections and/or terminals (ferrules), or else plural crimping machines are provided for processing the different wire cross-sections/terminals. The first solution requires long set-up times and considerable labor costs. This drawback is overcome in the latter solution by a plurality of crimping machines—however, the investment costs are significant.

In publication DE 10 2004 057 818 B3, a machine (in the form of a stripper, crimper) is disclosed by which different wire cross-sections and ferrules can be processed. For each ferrule, a reel magazine and a dedicated crimper are provided, with a joint drive that can optionally be operatively engaged in one of the crimpers being assigned to the former. Such solution requires high expenditure in terms of devices as a plurality of crimpers must be provided and controlled.

DE 10 2015 119 217 A1 originating from Applicant illustrates a crimping machine by which the afore-mentioned drawbacks are eliminated. This crimping machine includes a storage system comprising plural reel magazines to which a joint transport unit and a joint crimp head are assigned so that the expenditure in terms of devices is definitely reduced vis-à-vis the afore-described solution.

In the post-published DE 10 2017 118 968 to Applicant, a crimping machine is disclosed in which a terminal to be crimped is guided directly into the operating area of a stripping or crimping head without a feeding device or the like being interconnected. In this known solution, the terminals are preferably stored in reel magazines so that, correspondingly, the crimping machine is configured to include an isolating device.

DE 10 2015 102 060 A1 equally originating from Applicant illustrates a crimping machine in which different ferrules are held available in a storage system having plural reel magazines. A transport unit via which the ferrule preselected in each case is transported to a transfer position is assigned to each of said reel magazines. The ferrule separated there is then guided to a joint crimp head by means of a shuttle.

Said crimping machine excels by high productivity. However, a certain drawback is perceived in the fact that the shuttle required has a comparatively complex structure and claims corresponding installation space and that no stripping is possible.

Due to the great share of manual work, the requirements to operators during assembly and especially during subsequent laying of the wires in the switch cabinet are relatively high, wherein errors cannot be excluded.

On the other hand, the object underlying the disclosure is to provide a wire processing center (WPC) that ensures flexible wire assembly with high reliability of the production process.

This object is achieved by a WPC comprising the features of the independent claim.

Advantageous developments of the disclosure are the subject matter of the dependent claims.

Accordingly, a modular wire processing center (WPC) is suggested which is configured to include a central control unit for controlling plural processing modules. The control is performed in response to production data which can be predetermined by a CAE system or else alternatively can be entered manually. Accordingly, a processing module is an automatic crimper and at least two further processing modules from the group of automatic cutter, marking system, stripping unit, terminal feeding, wire feeding unit and wire discharging/bundling unit are used. Substantial modules, especially the automatic cutter, the marking system and the automatic crimper are preferably configured as individual processing units which are originally designed for standalone operation (standalone units). The processing modules and the control unit are preferably accommodated on a mobile or non-stationary platform so that the WPC can be moved to a desired mounting place, for example positioned adjacent to a switch cabinet.

This modular structure helps adapt the WPC very flexibly to different manufacturing jobs, wherein it can be started, for example, with a basic unit such as an automatic crimper which then is progressively supplemented by the further processing modules. This modular structure thus enables even smaller enterprises to cope with complicated manufacturing jobs by minimum investment.

The control unit and the processing modules can be designed so that wires/cables having different diameters, lengths and terminals can be successively assembled (as a sequence).

In an example, a handling system is used to convey the wires between or to processing modules.

In another example, a feeding unit is assigned to the automatic cutter for automatically feeding a wire having a particular cable cross-section to cut said wire to length in the automatic cutter.

The cut-to-length wire then can be picked off the automatic cutter or a storage tray by means of a handling device such as by means of a robot arm or by means of a linear unit, and can be moved into a positioning unit. At said positioning unit cable markers can be applied which are removed from the marking system (printer) by the handling device or another handling device and are applied to the wire held in the positioning unit. The same handling device or another handling device can be utilized to feed the marked wires to the automatic crimper and to feed the wires then crimped with terminals such as, e.g., ferrules to a further mounting step or to deposit them in a wire holding system.

In one variant of the disclosure, the control unit includes an industrial PC (IPC) preferably having a touch display.

In accordance with the disclosure, the standalone processing modules are preferred to be configured with interfaces for connection to the control unit or to one another.

The wires assembled by means of the WPC can be positioned relative to each other on a preferably rake-like wire holder so that thereon a predetermined sequence of prefabricated wires is held. Alternatively, the assembled wires may be bundled.

An especially flexible positioning of the WPC is ensured when the platform is in the form of a tool and gear wagon which can be moved very easily to the laying site.

The handling system may be a robot, a rotary table or any other unit for transporting the wires to be assembled to the individual processing modules.

BRIEF DESCRIPTION OF THE DRAWINGS

Examples of the disclosure shall be illustrated in detail in the following by way of schematic drawings, wherein.

DESCRIPTION

The basis of wire assembly by means of the modular wire processing center (WPC) 1 described in the following is represented by existing CAE data which are transmitted to the WPC 1. Said CAE data contain information about the wires to be assembled such as wire diameter, wire length, type of marker to be applied, type of ferrule, etc. Such CAE system is known, for example, by the designation ePlan®. According to FIG. 1, via the CAE system the wiring data then are transmitted to the WPC 1 via appropriate data transmission such as e.g. a network, or in simpler solutions also a USB stick. The WPC 1 comprises a central control unit formed, e.g., by an IPC 2 which is configured to include appropriate software for the control of processing modules. As explained at the beginning, the processing modules are standalone units which are originally operated in a conventional manner as standalone units. A difference from conventional standalone units consists in the fact that the individual processing modules are designed to be controlled by the afore-mentioned joint control unit so that the individual processing modules designed for individual operation can be operatively connected via said control unit so as to cope even with complex manufacturing jobs by appropriate selection of the processing modules.

Figure 1:
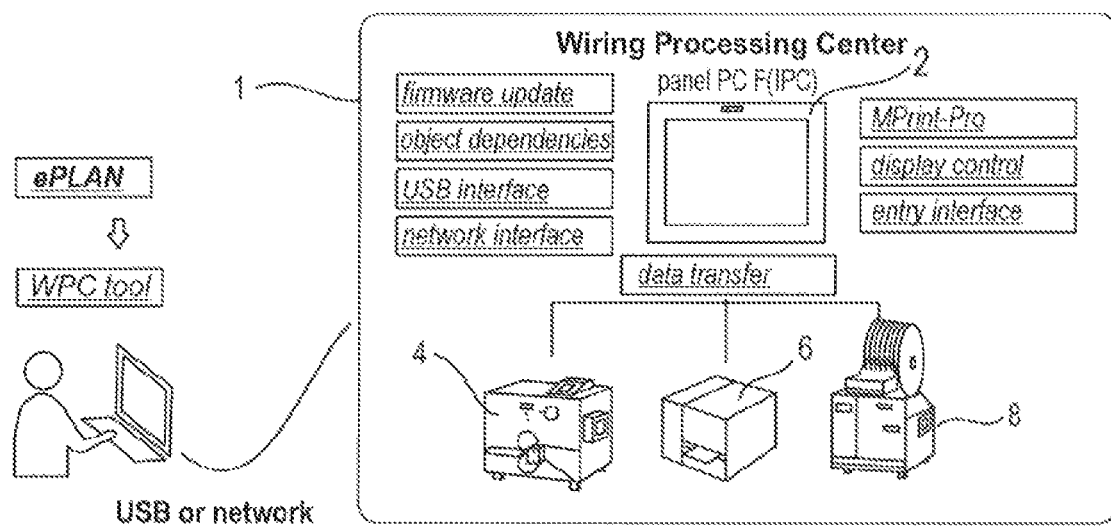
FIG. 1 shows a block diagram of a modular wire processing center.

FIG. 1 shows another software tool, referred to as WPC tool, via which the communication of the in-house hardware with the WPC 1 takes place. Said software tool, especially the IPC 2, includes all appropriate interfaces such as e.g. USB interface, network interface, entry interface as well as preferably a touch display via which all required data can be entered.

The manufacturing data generated by the IPC 2 then are transmitted, in turn, to the individual processing modules so that they process said information for wire assembly in response to the predetermined CAE data. In the illustrated example embodiment, the WPC 1 comprises an automatic cutter 4, a marking system 6 and an automatic crimper 8 of the design described in the beginning by which the wire ends are stripped and are crimped with ferrules or other terminals.

Control/regulation of the processing modules originally designed for standalone operation is performed centrally via the IPC 2, the individual processing modules enabling data transfer even among each other via appropriate interfaces.

The automatic cutter 4 is provided to cut individual conductors/wires (for example single-core, multi-core, plural-core or ultrafine-core) having different outer diameters. The respective wire is marked by the marking system 6. In the shown example, the marking system 6 includes a printer for labeling the wires or markers applied. Accordingly, the labeling position and the number of markers for each wire as well as the labeling text and the labeling color are predetermined by the IPC 2.

Of course, the individual wires may also have different colors—the WPC1 according to the disclosure allows for assembling all said variants in any sequence and, in so doing, for manufacturing wires having a length designed in accordance with the requirements.

The WPC tool so-to-speak is a work preparation software that is made available on a customer-side PC and allows, for example, for an importing function from ePlan®. Said PC then is connected, in turn, to the IPC 2 for data transfer.

The entire WPC1 preferably is arranged on a tool and gear wagon not shown in FIG. 1 which then can be moved to direct vicinity to the switch cabinet or to any other suitable position.

As will be illustrated in detail in the following, said tool and gear wagon enables the afore-mentioned processing modules to be compactly placed. There may also be provided a means for collecting the cut cables. The modules are arranged on the tool and gear wagon in such a way that the sequence of the process steps is configured according to optimum ergonomic aspects.

The tool and gear wagon includes e.g. an IPC holder which is preferably pivoting. Moreover, all connector strips for power, USB, HDMI, network, resources etc. are provided. Further, the tool and gear wagon may also be provided with a drawer/tray for hand-held tools and additional trays for documents. Basically, even a supply of wire material may be provided on the tool and gear wagon. Also, storage of further ferrule rollers can be realized on the tool and gear wagon.

In one example, the assembled wires are positioned on a wire holding/sorting system which is in the form of a rake, for example. The wire sequence provided for a switch cabinet then can be disposed at said system with appropriate labels.

Figure 2:
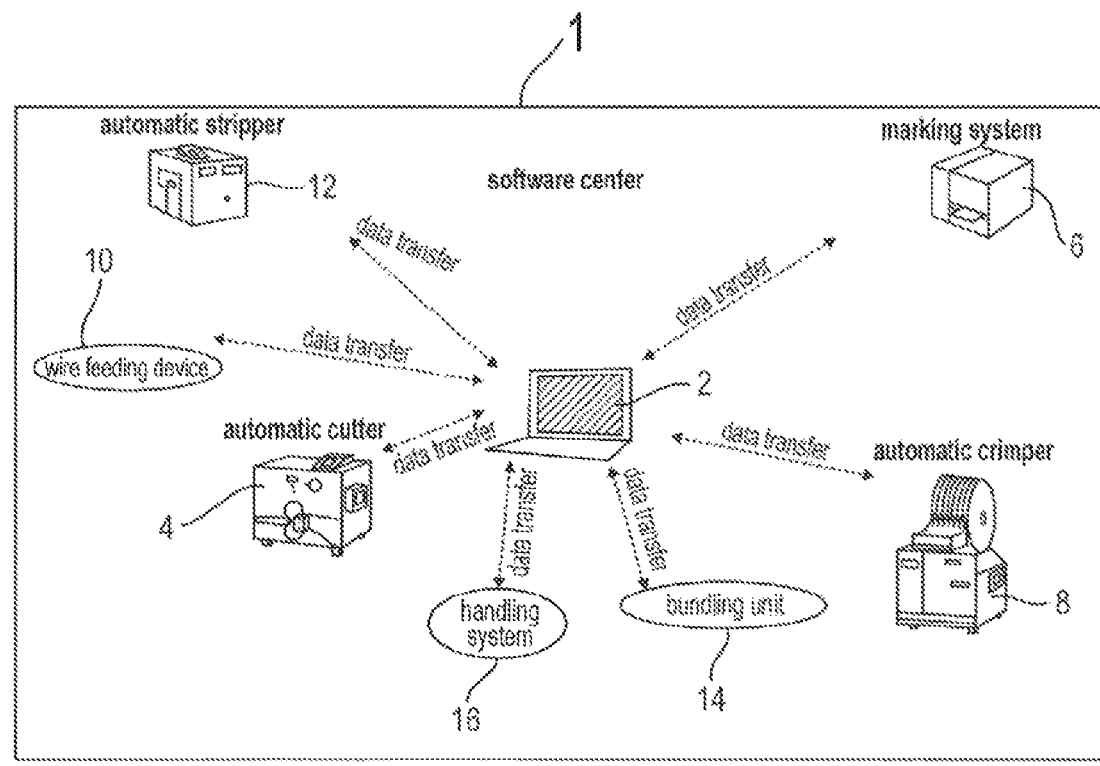
FIG. 2 shows a block diagram of a more complex wire processing center.

FIG. 2 illustrates a variant of the afore-described example in which by far more processing modules are provided. The central control is again performed via an IPC 2. The processing modules provided are a wire feeding device 10, the automatic cutter 4, the marking system 6, the automatic crimper 8, in addition an automatic stripper 12, a bundling unit 14 for bundling the assembled wires and a central handling system 16 through which the wires are transported between the individual processing modules.

All of said components are preferably disposed jointly on a tool and gear wagon or any other mobile platform.

The processing modules are connected, for data exchange, to one another and to the IPC 2 via suitable interfaces and a suitable network so that practically any wire assembling job can be coped with in a very flexible manner.

Figure 3:
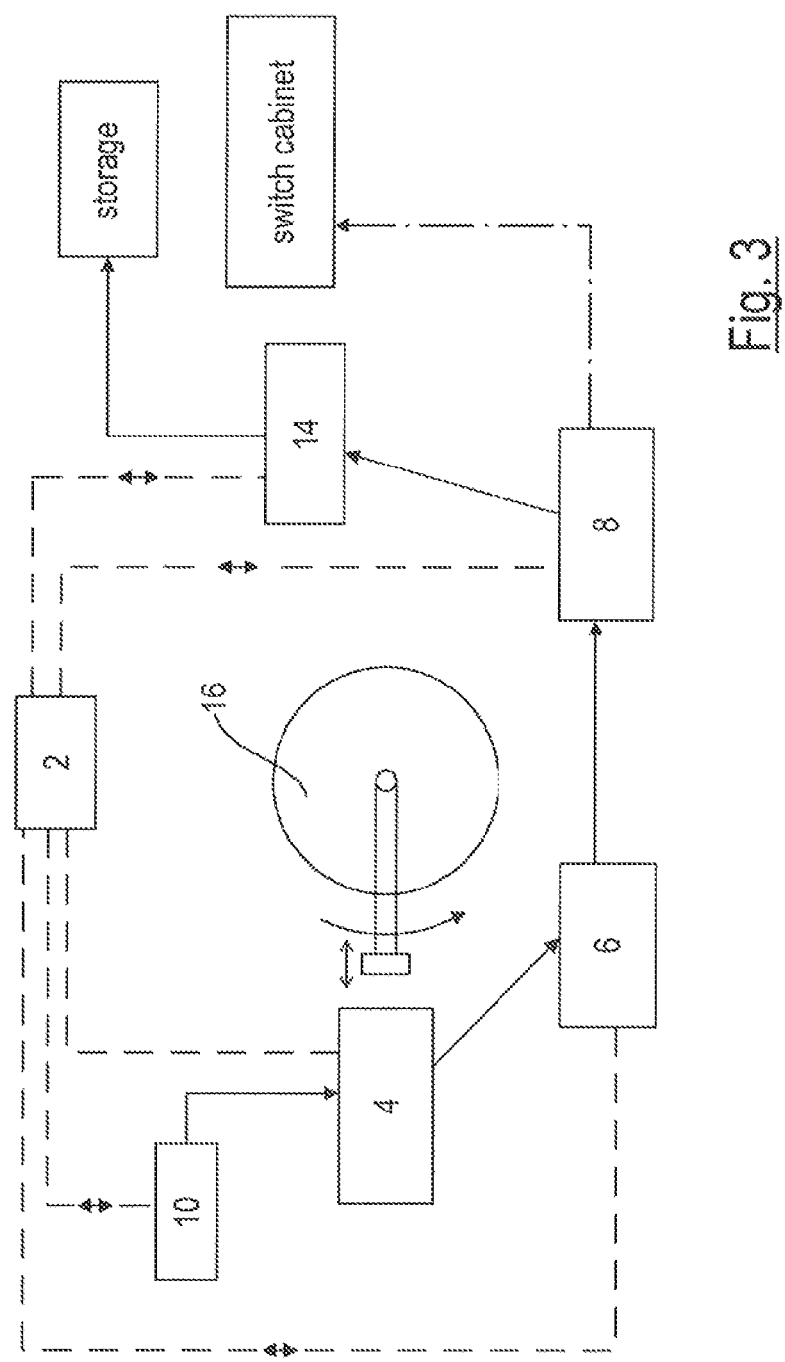
FIG. 3 shows a block diagram for illustrating the manufacturing process in a wire processing center according to the disclosure.

FIG. 3 illustrates a typical manufacturing process by means of a WPC 1 according to the disclosure. Accordingly, the wires to be processed are fed by a wire feeding device 10—said feeding can again be carried out by the handling system 16. In the automatic cutter 4 the wires are cut to the predetermined wire length, are subsequently marked by cable markers created in the marking system 6 and are then stripped and crimped with ferrules in the automatic crimper 8. The wires are transported between the individual processing modules through the handling system 16.

The assembled wires then are either bundled or positioned on the afore-described rake or else are laid directly via a handling system or an operator in the switch cabinet. The operator can be provided, e.g. via a VR system, with appropriate information defining the laying position of the respective individual wire within the switch cabinet so that the operator can carry out the laying of wires practically error-free in the predetermined sequence with minimum time expenditure. In a variant of the disclosure, even a further robot or the like can carry out the laying.

Figure 4:
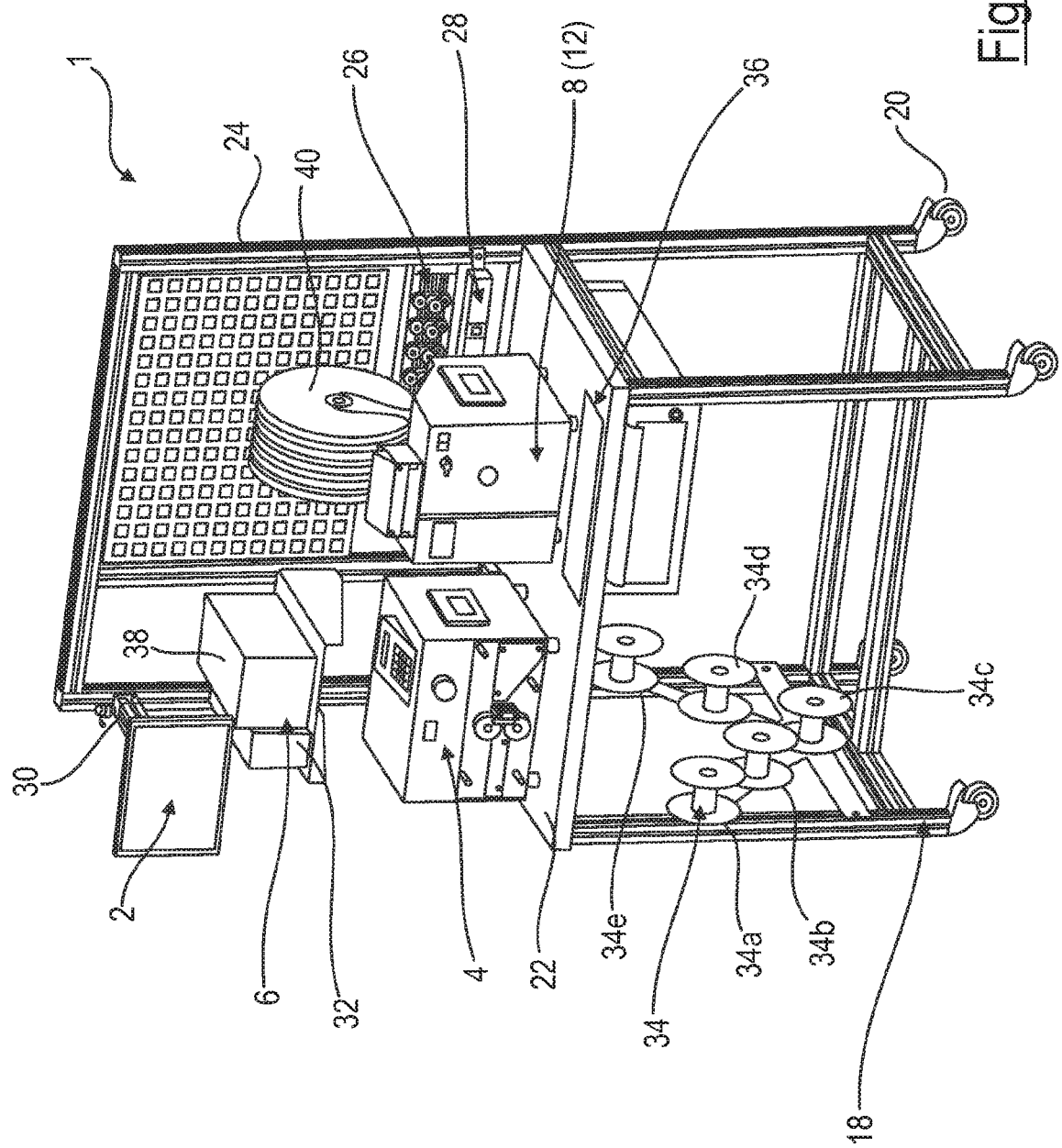
FIG. 4 shows a concrete example of a wire processing center according to the disclosure in a first expansion stage.

FIG. 4 shows a concrete example of a wire processing center (WPC 1) configured in accordance with the afore-explained concept. Accordingly, an expansion stage comprising an automatic cutter 4, an automatic crimper 8 designed with an integrated automatic stripper 12, comprising an IPC 2 as well as a marking system 6 is used.

The units are mounted on a mobile platform configured as a tool and gear wagon 18 in the shown example. Said tool and gear wagon has four fixable rollers 20 which allow for positioning the tool and gear wagon 18 in the area of a switch cabinet or the like so that laying of the cables on site is facilitated. The tool and gear wagon 18 includes a rack to which a work plate 22 disposed approximately in the horizontal direction is fastened on which, for example, the automatic crimper 8 as well as the automatic cutter 4 are fastened or positioned. At a support frame 24 of the tool and gear wagon 18 extended on the rear side, supply terminals such as a pneumatic connecting strip 26 and a power strip 28 for current and resources supply of said processing modules are arranged.

As can be inferred from FIG. 4, the IPC 2 is adjustably retained on the support frame 24 by means of an IPC holder 30 so that the operator can adjust the IPC 2 and, respectively, the screen thereof to a relative position suitable for the respective activity in which the operator always keeps an eye on the screen.

A console 32 on which the marking system 6, e.g. including a label feeder and a printer 38, is supported, is further fastened to the approximately vertical support frame 24 of the tool and gear wagon 18. The afore-mentioned components 2, 4, 6, 8 (12) are connected to the power strip 28 and, respectively, to the pneumatic connecting strip 26. As previously explained, the IPC 2 is moreover connected to an in-house network via a network terminal. As a matter of course, the IPC 2 may as well be in the form of a standalone solution.

As illustrated at the beginning, the tool and gear wagon 18 including the afore-described processing modules is moved to the mounting area and is then connected to the power and resources supply provided there so that all components are supplied with power and, respectively, resources.

In the area beneath the work plate 22, there are disposed cable reels 34a, 34b, 34c, 34d and 34e which are equipped with wires designed with different wire cross-sections. Usually, wire cross-sections of 0.34 mm, 0.5 mm, 0.75 mm, 1.0 mm, 1.5 mm, 2.5 mm or 4.0 mm are processed so that the cable reels 34 may be provided, for example, with five of said cross-sections. Basically, it is also possible to configure two or more cable reels with a predominantly required wire cross-section so that the WPC 1 can be operated for a relatively long time without having to replace the cable reels.

The cable reels 34 are positioned on the rack of the tool and gear wagon 18 preferably such that the operator can easily reach the individual wires, or such that, in the case of automated manufacture, the wires can be guided to the respective processing unit via a guide of simple structure. This will be explained in more detail in the following. In principle, it is also possible to retain the wires with their wire ends in the area of the automatic cutter 4 on a wire holder so that the operator can easily grasp the wire.

In the area of the automatic crimper 8, a storage tray 36 for the cut-to-length or assembled wires is provided. As explained in the foregoing, the above-described components/processing modules are connected to the resource connections such as the pneumatic connecting strip 26 and/or the power strip 28 and are fixedly positioned on the tool and gear wagon 18. The tool and gear wagon 18 supporting the WPC 1 and comprising the afore-described components then is moved to the switch cabinet and is connected to the resource/power supply as well as, where appropriate, the IPC 2 is connected to the in-house network via a network connection.

The wiring data required for performing each work order can be prepared e.g. on an external PC and can then be transferred to the IPC 2 via the network connection. In simpler solutions, the wiring data can be transferred to the IPC 2 via a suitable data carrier such as an USB stick or the like. Alternatively, direct entry on the IPC 2 is also possible, of course, to generate the wiring data.

After that, the operator selects the desired job (work order), where appropriate, and the program is correspondingly started so that, in response to the work order, the afore-described processing modules, especially the automatic cutter 4, the marking system 6 and the automatic crimper 8 (automatic stripper 12) are properly programmed.

As previously described, five wires having different wire cross-sections are stored on the tool and gear wagon 18. Depending on the working instruction conveyed to the operator via the screen of the IPC 2, then the corresponding cable is introduced to the automatic cutter 4, wherein the IPC 2 displays the cable information to the operator. Corresponding to the programming of the automatic cutter 4, then the respective wire is cut to length. After such cutting to length, the wire is then deposited by the operator in the storage tray 36. When the program is started as afore described after selecting the desired job, also the printing information is transmitted in parallel by the IPC 2 to the marking system 6, more exactly speaking to the printer 38 thereof, so that the latter prints the labels and suitable cable markers are provided. The latter are then manually picked off by the printer 38 and are fastened to one or, where necessary, both ends of the wire.

Depending on the job, also the cross-sectional and crimping information have been transferred to the automatic crimper 8 (in this case with integrated automatic stripper 12) through the ICP 2. Corresponding to these specifications, via the machine control the correct cross-section corresponding to the wire to be processed is appropriately adjusted on the automatic crimper 8/automatic stripper 12. In turn, it can be read from the IPC 2 that the crimping unit is correspondingly programmed and ready-to-operate.

After that, the operator inserts the first wire end into the automatic crimper 8/automatic stripper 12 so that the wire end is stripped and the ferrule selected according to the specification is crimped onto the wire.

As illustrated at the beginning, in the shown example embodiment the automatic crimper 8 has a storage system including five reel magazines 40 each having a webbing with a particular ferrule diameter. Depending on the programming via the IPC 2, a predetermined ferrule or any other terminal is separated through a separating device and is then fed to a joint crimp head of the automatic crimper 8 for crimping. Further details on said automatic crimper 8 and the dedicated automatic stripper 12 are described in Applicant's DE 10 2017 118 968 quoted at the beginning.

After the crimping process, the operator removes the wire from the automatic crimper 8 and, where necessary, feeds the second wire end of the wire to the automatic crimper 8 for another crimping process.

After one-sided or double-sided crimping, the assembled wires then are removed and stored in a wire holding system which is not shown. Corresponding to the mounting steps predetermined by the IPC, the operator then removes the individual wires from said wire holding system and installs them in the switch cabinet.

Figure 5:
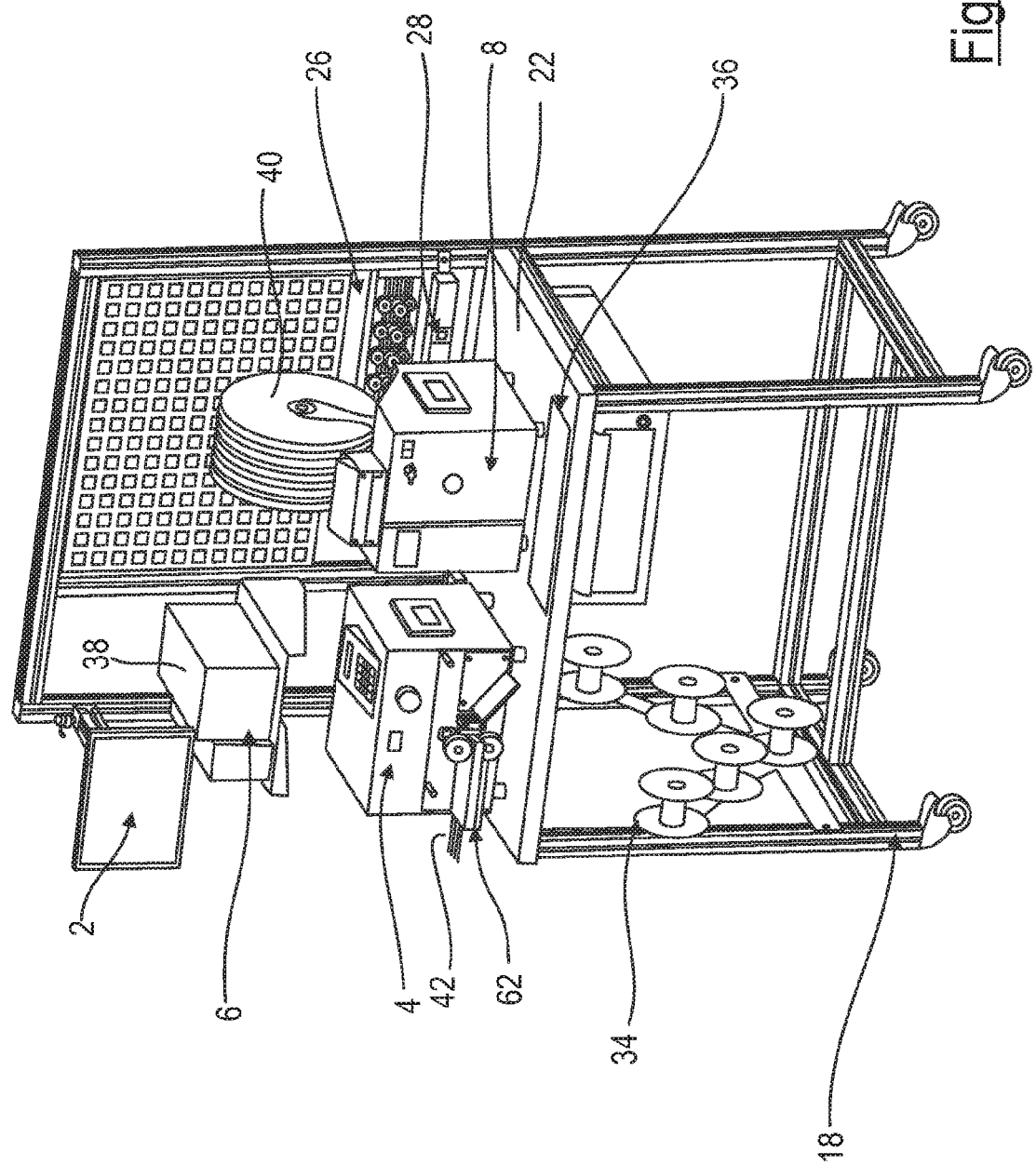
FIG. 5 shows a variant of the example according to FIG. 4 comprising a modified automatic cutter.

FIG. 5 illustrates a variant of the example according to FIG. 4, wherein merely the automatic cutter 4 and the feeding of the wires from the cable reels 34 are modified as compared to the afore-described solution so that, hereinafter, merely these differences will be discussed and, for the rest, the above description can be referred to.

Figure 6:
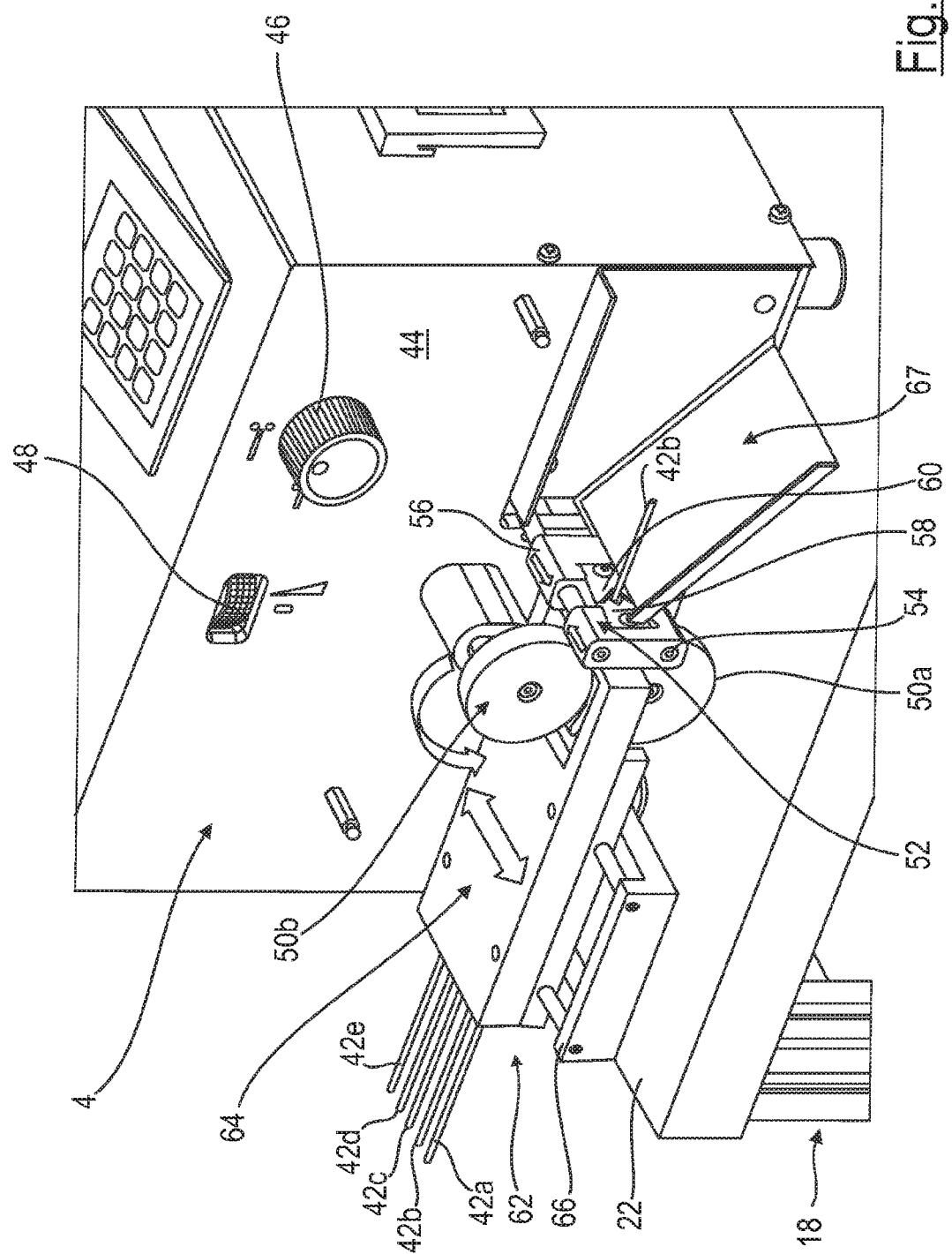
FIG. 6 shows a detail view of the automatic cutter according to FIG. 5.

FIG. 6 illustrates a detailed view of the automatic cutter 4 used in the example according to FIG. 5. As explained before, said automatic cutter is fastened on the work plate 22 of the tool and gear wagon 18 and on its front plate 44 includes adjusting elements 46, 48 for manual adjustment of the automatic cutter 4. However, in the shown example embodiment, adjustment is not performed via said adjusting elements 46, 48 but via the internal machine control which is controlled by the IPC 2.

From FIG. 6 two drive rollers 50a, 50b superimposed in vertical direction (view of FIG. 6) of a transport unit are visible which frictionally act on the respective wire 42 to transport the latter in the wire longitudinal direction, with the transport length being predetermined by the IPC 2 and the corresponding control of the drive rollers 50a, 50b. When viewed in the conveying direction, following the drive rollers 50a, 50b a cutting unit 52 is provided that includes two cutting jaws 54, 56 displaceable in the horizontal direction (cf. arrows in FIG. 6) and including cutting blades 58, 60 which are designed such that all wire cross-sections can be cut to length. The basic structure of the cutting unit 52 and the drive rollers 50b is known so that further explanations are dispensable.

In the shown example, the five wire cross-sections are guided, through a guide which is not shown, to a feeding unit 62 via which each wire cross-section to be processed then is positioned relative to the transport unit with the drive rollers 50a, 50b and relative to the cutting unit 52.

In the shown example, the feeding unit 62 has an adjusting carriage 64 that is adjustable transversely to the wire transport axis and is adjustable in the arrow direction on a carriage guide 66 so as to align each of the wires 42a, 42b, 42c, 42d or 42e with respect to the drive rollers 50a, 50b. The adjustment can be electric, pneumatic, hydraulic or any other, with the positional accuracy being designed, of course, such that a predetermined positioning relative to the drive rollers 50a, 50b and the cutting unit 52 is enabled.

The cut-to-length wire 42b then is discharged via an inclined delivery chute 66 and is deposited in the storage tray 36 automatically or by the operator.

In contrast to the afore-described example, the wire cross-section to be processed is not manually selected. The selection is made by suitable control of the feeding unit 62 in response to the selection of the desired job after starting the program. As explained in the foregoing, the adjusting carriage 64 then is displaced in the transverse direction corresponding to the specification, until the wire to be processed, e.g. the wire 42b, is aligned relative to the operating area of the drive rollers 50a, 50b. Accordingly, the wire to be processed is aligned about tangentially to the drive rollers 50a, 50b and thus is drawn into the interstice between the two rollers 50a, 50b. It is basically sufficient when either of the two drive rollers 50a, 50b is driven and the other drive roller merely acts as a backstop.

In the shown example, the drive rollers 50a, 50b are configured to include a means that ensures the two drive rollers 50a, 50b to be moved apart before the operative engagement so as to facilitate the relative positioning of the wire cross-section to be cut to length. The drive rollers 50a, 50b are moved apart/lifted via a mechanism which is not shown in response to the control signals of the IPC 2. After displacing the adjusting carriage 64 to the desired relative position (alignment of the wire 42b to be processed), the drive rollers 50a, 50b then are returned so that they enter into frictional engagement with the wire 42b. Consequently, the drive rollers 50a, 50b are controlled so that by rotation thereof the wire 42b is moved such that the wire end projects somewhat from the cutting blades 58, 60 of the cutting unit 62. In the next step, the cutting unit 52 is controlled to cut the wire in the area of the wire end so as to obtain a defined starting point for the process of cutting to length. In the next working step, the drive rollers 50a, 50b are controlled corresponding to the desired wire length.

Feeding can be further improved when the adjusting carriage 64 is also adjustable in the wire direction so that, by transverse adjustment and longitudinal adjustment, the respective wire can be exactly introduced to the interstice between the drive rollers 50a, 50b.

The drive roller(s) 50a, 50b is/are controlled so that a wire portion with a predetermined length is moved beyond the cutting blades 58, 60. As soon as the predetermined length is reached, the drive of the drive rollers 50a, 50b is stopped and the cutting unit 52 is actuated for cutting to length. As previously explained, then the cut-to-length wire (here wire 42b) slips along the delivery chute out of the operating area of the cutting unit 52 so that the following process of cutting to length will not be obstructed. Marking and crimping are carried out as in the afore-described example embodiment so that further explanations are dispensable.

Figure 7:
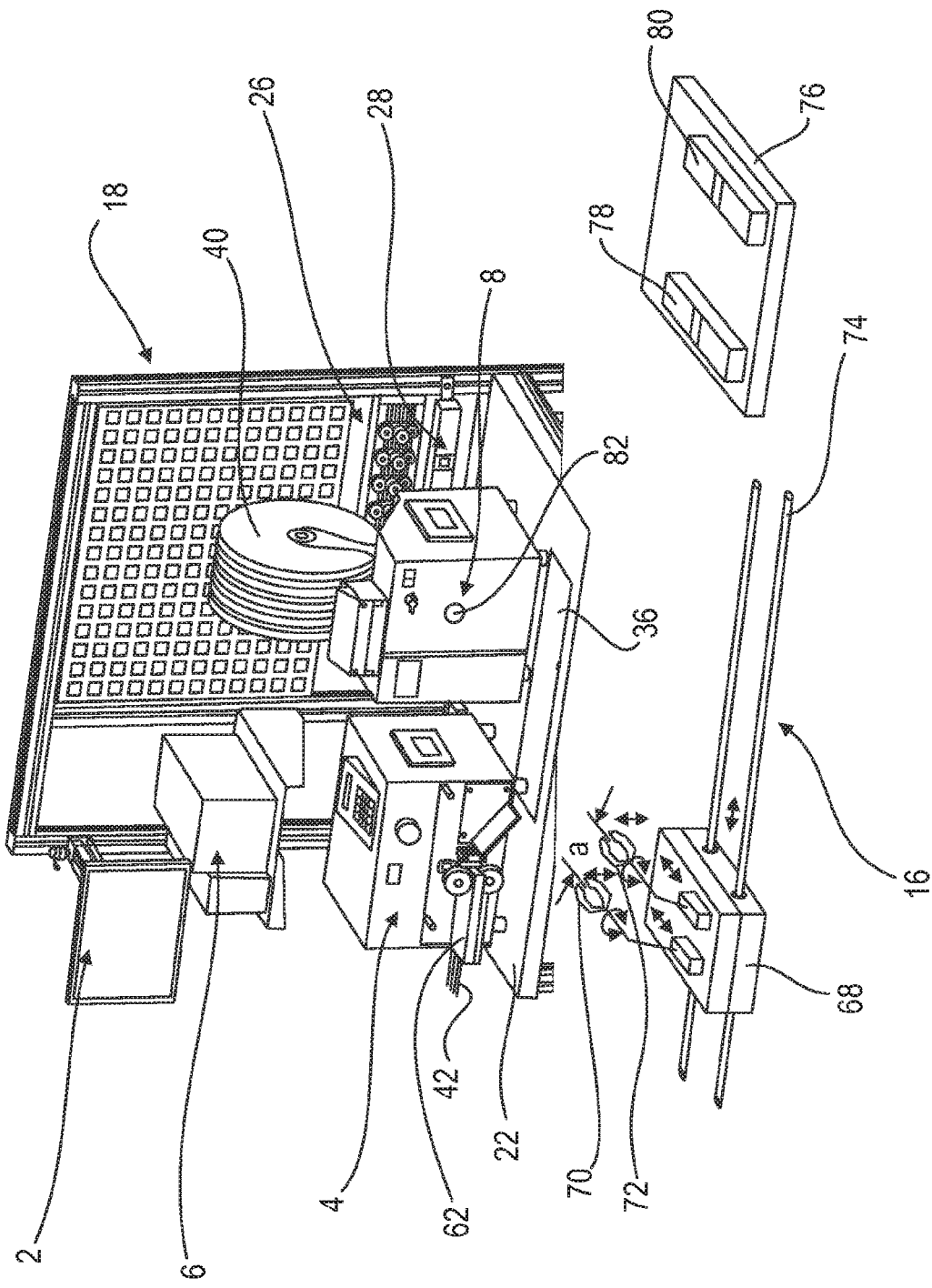
FIGS. 7 and 8 show further examples of a wire processing center according to the disclosure having a degree of automation that is increased vis-à-vis the afore-described solutions.

FIG. 7 illustrates another expansion stage of the example embodiment according to FIG. 6 which is designed with a feeding unit 62 for automated feeding of the wire 42 to be processed.

In the example embodiment shown in FIG. 7, the cut-to-length wire is moved along automatically. As explained before, the cut-to-length wire 42 is intermediately stored automatically or manually, for example deposited in the storage tray 36.

As indicated in FIG. 7, a carriage 68 on which two grippers 70, 72 are supported is guided on the work plate 22 or in an area disposed in parallel thereto. The carriage 68 with the two grippers 70, 72 can be adjusted along a linear unit 74, preferably approximately in the longitudinal direction of the wires 42. The grippers 70, 72 may be adjustable in the arrow direction, i.e. transversely to the adjusting direction or else in the direction of the distance a, so as to enable them to be adapted to wire lengths and cross-sections different in height. The gripping elements of the two grippers 70, 72 and the actuators thereof are designed so that they can grip and hold the wires 42 in the area of their end portions.

After cutting to length, the wires 42 then are picked off by the grippers 70, 72, with the carriage 68 being moved to the required transfer position through the linear unit 74. By controlling the grippers 70, 72 by means of the IPC 2, the cut-to-length wire 42, e.g. the wire 42b (see FIG. 6), is taken over directly at the automatic cutter 4 or in the storage tray 36. Consequently, the carriage 68 is displaced via the linear unit 74 toward a positioning unit 76 and the wire 42b is deposited there. This positioning unit 76 has two clamping positions 78, 80 in which the wire ends are deposited/clamped so that the cut-to-length wire is retained in a stretched position. For each wire length different positioning units 76 can be provided. However, it is basically also possible to configure the clamping positions 78, 80 to be adjustable so that different lengths can be processed by one positioning unit 76.

After depositing the cut-to-length wire 42 in the positioning unit 76, the carriage 68 is returned again by means of the linear unit 74. Then the grippers 70, 72 are controlled so that they pick off/take over the wire marker(s) created in parallel in the marking system 6 by the printer 32. By further control of the linear unit 74 and the actuators of the carriage 68, said wire markers are automatically applied to one or both of the wire ends so that the wire 42b is appropriately marked.

After applying the wire marker(s), the marked wire 42b is gripped by means of the grippers 70, 72 and is moved to the automatic crimper 8 by appropriately controlling the linear unit 74 and the gripper actuators. The grippers 70, 72 are then controlled in such a way that the wire end to be stripped and to be crimped is inserted into a feed opening 82 of the automatic crimper 8 so that the afore-described stripping and the crimping with the corresponding ferrule is carried out. During said crimping process, the wire 42 is preferably continued to be held by the grippers 70, 72. In case that the also other end of the wire 42 is to be crimped with a ferrule, the wire 42 is rotated about approx. 180° by appropriately controlling the grippers 70, 72 and said other end is inserted into the feed opening 82 for stripping and crimping.

After said crimping process, the wire is finally removed via the grippers 70, 72 and is fed to the next working step. In this way, for example the crimped wire can be deposited in the afore-mentioned wire holding system.

In the shown example, a handling device having two grippers 70, 72 is described, the actuators thereof being arranged in the area of the carriage 68 which is adjustable by means of the linear unit 74. As a matter of course, instead of this mechanism, also a different handling device such as a robot or the like can be used which enables the afore-described working steps to be carried out in an automated manner.

Figure 8:
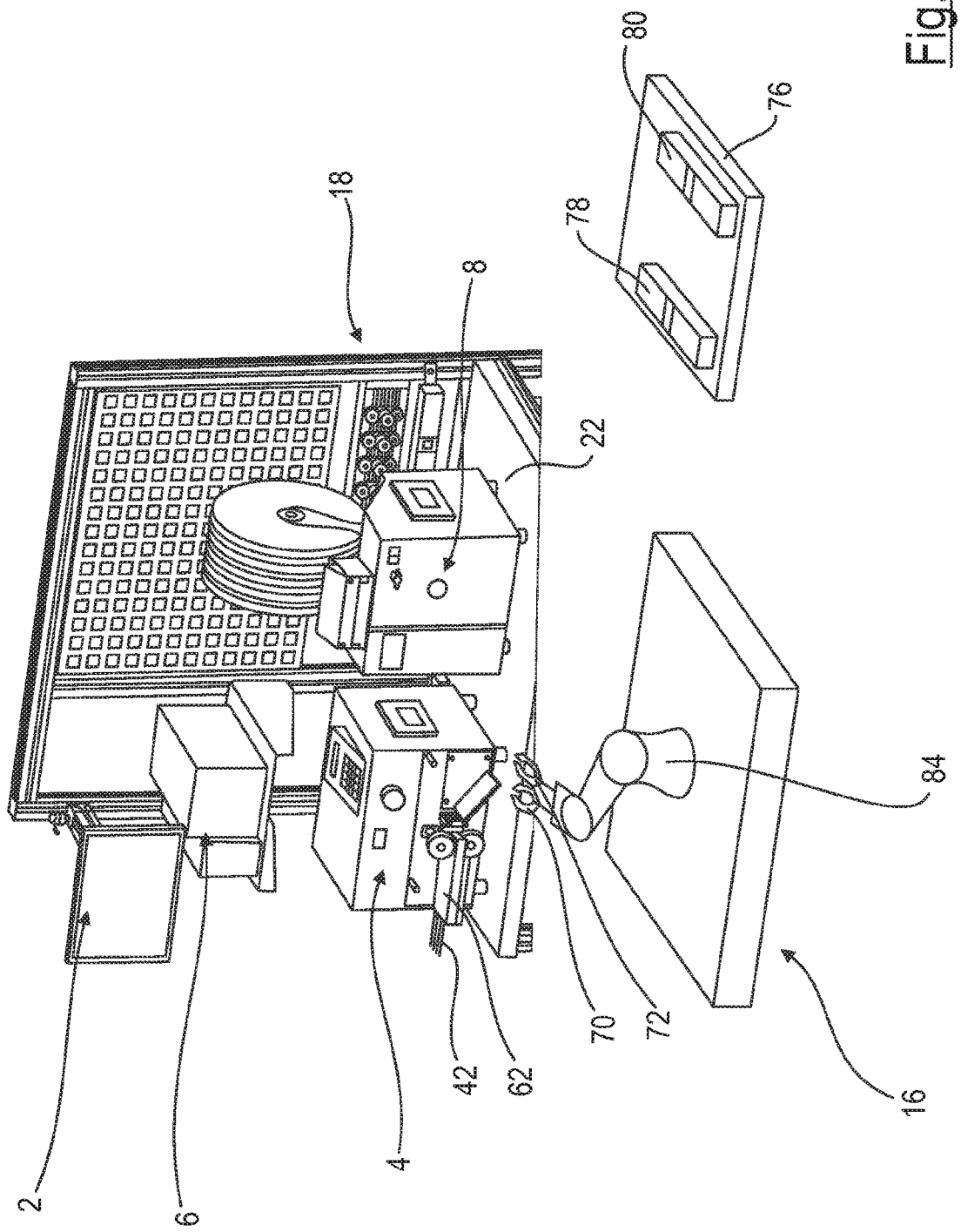

FIG. 8 shows a variant in which, instead of the handling device including a linear unit 74, a carriage 68 adjustable by the linear unit 74 and the grippers 70, 72 supported thereon, a robot arm 84 is used at the distal end portion of which the two grippers 70, 72 are retained. The robot arm 84 is designed to have an operating area which permits to carry out the afore-described manufacturing steps, i.e. the takeover of the cut-to-length wire from the automatic cutter 4 and the depositing on the positioning unit 76 as well as the takeover of the wire markers from the marking system 6 and the transfer thereof to the wire ends as well as the feeding of the marked wire 42 to the automatic crimper 8 (automatic stripper 12) and the transport of the crimped wire 42 to the next processing step.

Basically, it is also possible to have two or more handling devices carry out the individual partial steps. It is imaginable, for example, that the wire markers are taken over from the printer 38 (marking system 6) via a further handling device and after that are attached to the wires 42 deposited in the positioning unit 76.

Basically, the cut-to-length wire can also be moved to the marking system 6 via a suitable handling device such as the grippers 70, 72 and there can be directly marked.

The degree of automation can be further developed so that the assembly of the wire is substantially possible without any manual intervention of the operator. However, the latter has the possibility, by way of the representation of the mounting processes on the IPC 2, to correct by intervention. The assembled wires then can be processed directly in the switch cabinet, wherein the desired mounting position of the respective wire with the wire marker is displayed to the operator on the IPC 2 so that incorrect mounting is practically excluded. On principle, it is also possible to perform this final mounting in an automated manner in the switch cabinet, wherein the respective wire is provided, for example, by means of a handling device and the wire concerned merely has to be mounted/connected by the operator.

It is a substantial advantage of the modular system according to the disclosure that existing automatic machines can be integrated in the WPC 1 with little effort and that different expansion stages can be gradually implemented so that the investment costs can be adapted to the respective need in a comparatively flexible manner.

The disclosure relates to a wire processing center which comprises a plurality of individual processing modules that are controlled by a central control unit.

LIST OF REFERENCE NUMERALS

1 WPC
2 IPC
4 automatic cutter
6 marking system
8 automatic crimper
10 wire feeding device
12 automatic stripper
14 bundling unit
16 handling system
18 tool and gear wagon
20 roller
22 work plate
24 support frame
26 pneumatic connecting strip
28 power strip
30 IPC holder
32 console
34 wire reel
36 storage tray
38 printer
40 reel magazine
42 wire
44 front plate
46 adjusting element
48 adjusting element
50 drive roller
52 cutting unit
54 cutting jaw
56 cutting jaw
58 cutting blade
60 cutting blade
62 feeding unit
64 adjusting carriage
66 carriage guide
67 delivery chute
68 carriage
70 gripper
72 gripper
74 linear unit
76 positioning unit
78 clamping position
80 clamping position
82 feed opening
83 robot arm

What is claimed is:

1. A modular wire processing center comprising a central control unit for controlling plural processing modules in response to production data which are predetermined by a computer aided engineer system or are manually entered, one of the plural processing modules being an automatic crimper and at least two further processing modules of the plural processing modules being selected from a group of an automatic cutter, marking system, stripping unit, terminal feeding, wire feeding unit and wire discharging/bundling unit, wherein the plural processing modules are designed as independently operable individual processing units and are positioned, jointly with the central control unit, on a mobile platform, wherein the central control unit and the plural processing modules are designed so that wires having different diameters and different terminals can be assembled successively in any order.

2. The modular wire processing center according to claim 1, further comprising a handling system for transporting the wires between the plural processing modules.

3. The modular wire processing center according to claim 2, wherein the handling system is a robot, a linear unit including grippers, or a rotary table.

4. The modular wire processing center according to claim 1, wherein the central control unit is an industrial PC configured to include a touch display.

5. The modular wire processing center according to claim 1, wherein the plural processing modules have interfaces for connection to the central control unit and/or to each other and/or to a network.

6. The modular wire processing center according to claim 1, further comprising a holding system for receiving a predetermined sequence of assembled wires.

7. The modular wire processing center according to claim 1, wherein the mobile platform is a workshop wagon.

8. The modular wire processing center according to claim 1, further comprising a positioning unit for depositing a cut-to-length wire.

9. The modular wire processing center according to claim 1, further comprising a storage tray for cut-to-length wires.

10. A modular wire processing center comprising a central control unit for controlling plural processing modules in response to production data which are predetermined by a computer aided engineer system or are manually entered, one of the plural processing modules being an automatic crimper and at least two further processing modules of the plural processing modules being selected from a group of an automatic cutter, marking system, stripping unit, terminal feeding, wire feeding unit and wire discharging/bundling unit, wherein the plural processing modules are designed as independently operable individual processing units and are positioned, jointly with the central control unit, on a mobile platform, wherein the modular wire processing center further comprises the wire feeding unit for feeding a wire having a wire cross-section from a storage for wires having a plurality of wire cross-sections to a further processing module, wherein the feeding unit has an adjusting carriage that is adjustable transversely to a wire transport axis and configured to align the wire relative to the further processing module.

11. The modular wire processing center according to claim 10, wherein one of the at least two further processing modules is the automatic cutter.

12. A modular wire processing center comprising a central control unit for controlling plural processing modules in response to production data which are predetermined by a computer aided engineer system or are manually entered, one processing module of the plural processing modules being an automatic crimper and at least two further processing modules of the plural processing modules being selected from a group of an automatic cutter, marking system, stripping unit, terminal feeding, wire feeding unit and wire discharging/bundling unit, wherein the plural processing modules are designed as independently operable individual processing units and are positioned, jointly with the central control unit, on a mobile platform, wherein the modular wire processing center further comprises a handling system for transporting wires between the plural processing modules, wherein the handling system comprises a linear unit and grippers, and the grippers are adjustable in directions, so as to be adapted to wire lengths and cross-sections different in height.

* * * * *